United States Patent
Takahashi et al.

[11] Patent Number: 5,951,885
[45] Date of Patent: Sep. 14, 1999

[54] METHOD AND APPARATUS FOR GENERATING WELDING PRESSURE IN A ROLLER SEAM WELDING MACHINE

[75] Inventors: Nobuo Takahashi; Kiyoshi Kobayashi; Akira Takamatsu, all of Saitama, Japan; Daniel Wenk, Baden, Switzerland

[73] Assignee: Elpatronic AG, Bergdietikon, Switzerland

[21] Appl. No.: 08/847,282

[22] Filed: May 1, 1997

[30]  Foreign Application Priority Data

May 2, 1996 [CH] Switzerland ................ 1104/96

[51] Int. Cl.[6] ............................................ B23K 11/06
[52] U.S. Cl. ................................................ 219/83; 219/64
[58] Field of Search .................... 219/64, 81, 82, 219/83

[56] References Cited

U.S. PATENT DOCUMENTS

| | | |
|---|---|---|
| 2,412,266 | 12/1946 | Mero et al. . |
| 3,591,756 | 7/1971 | Timko ........................ 219/64 |
| 4,476,371 | 10/1984 | Schreiber ................... 219/64 |
| 5,122,629 | 6/1992 | Stieger ....................... 219/64 |
| 5,622,637 | 4/1997 | Taiana ........................ 219/64 |

FOREIGN PATENT DOCUMENTS

| | | |
|---|---|---|
| A-0 685 288 | 12/1995 | European Pat. Off. . |
| A-57-149069 | 9/1982 | Japan . |
| 59-85382 | 5/1984 | Japan ....................... 219/64 |
| A-59-085382 | 5/1984 | Japan . |
| A-1 320 597 | 6/1973 | United Kingdom . |

Primary Examiner—Clifford C. Shaw
Attorney, Agent, or Firm—McCormick, Paulding & Huber

[57] ABSTRACT

In a roller seam welding machine, the upper welding roller is led through a welding-force adjustment device with two spring elements. One spring is already effective when the initial deflection of the welding roller occurs. The other spring comes into operation only when a certain deflection (D) is reached. A marked improvement in weld quality can be obtained in this way, particularly at the start of the weld seam.

9 Claims, 1 Drawing Sheet

METHOD AND APPARATUS FOR GENERATING WELDING PRESSURE IN A ROLLER SEAM WELDING MACHINE

BACKGROUND OF THE INVENTION

The invention relates to a method for generating welding pressure in a welding machine with electrode rollers. The invention also relates to an apparatus for this purpose.

In welding machines with electrode rollers, in which the actual electrode may be in the form of a wire electrode running over the rollers, it sometimes happens that there is insufficient fusion at the initial weld point of a workpiece with a butted or overlapped seam, in particular a can body, which is pushed between the rollers. This problem is particularly apt to occur at the high rates of travel which can now be attained. The inertia of the welding rollers, and particularly, in the case of can body welding, that of the larger outer roller, initially causes welding pressure to be excessive so that the electrical resistance of the overlapped seam is very low, which may result in a lack of fusion. Moreover this may result in microleaks in the cans fabricated by this process (aerosol cans in particular), even when the initial weld point of such cans lies in the bead region. The welding pressure must, however, reach a sufficiently high value for the remaining regions of the seam to ensure reliable transport through the welding zone and to avoid excessive vibration of the welding rollers following insertion of the workpiece between the rollers.

The basic object of the invention, therefore, is to eliminate or at least reduce the problem at the initial weld point, while ensuring that welding is performed correctly along the seam.

SUMMARY OF THE INVENTION

That can be achieved, in a method and an apparatus of the kind stated at the outset, by providing for at least one of the rollers a spring arrangement exerting on the roller a non-uniform variation in force with deflection of the roller.

This makes it possible to set a low welding pressure at the start of the welding operation, when the leading edge of the workpiece reaches the welding rollers and begins to push them apart; if need be, it is even possible to apply zero spring pressure initially so that an effective welding pressure is exerted only by the inertia of the roller in relation to the deflection forced by the workpiece. As soon as the workpiece has been pushed further between the rollers so that these undergo a greater deflection, the welding force can be increased to its normal level. The result is a lower welding force initially, with good fusion at the initial point, followed by a higher welding force equal to that which is normally applied. The increase in welding force after a certain deflection has taken place has moreover been found to have a beneficial effect on the vibration behaviour of the roller, which furthermore improves the quality of the weld seam.

The change in welding force preferably takes place when the deflection of the roller reaches a preset value, which is adjustable.

It is also preferable, in lap welding, ie. where the workpiece is fed between the rollers with double the thickness of the sheet metal, that the transition from low welding force to increased welding force is made at a deflection approximately corresponding to a single thickness of sheet metal.

BRIEF DESCRIPTION OF THE DRAWINGS

Exemplary embodiments of the invention will now be described in detail with reference to the drawings, in which.

DESCRIPTION OF THE PREFERRED EMBODIMENTS

Figure 1:
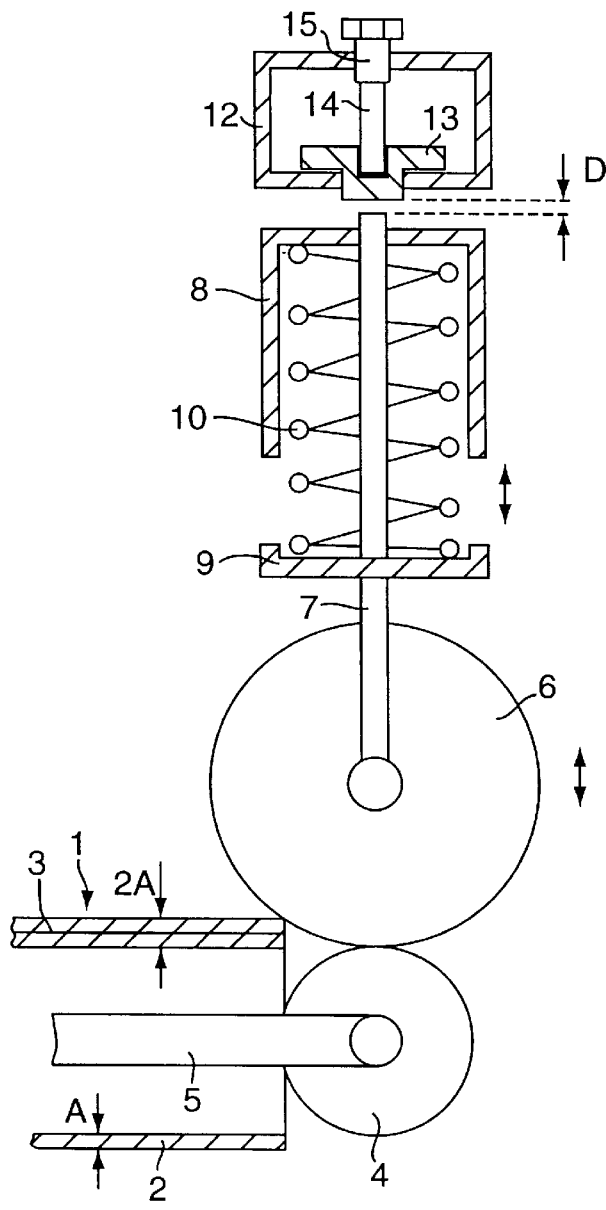
FIG. 1 is a highly schematic view of the welding rollers of a roller seam welding machine.

FIG. 1 shows highly schematically the insertion of a workpiece 1 in the form of a can body between the welding rollers of a roller seam welding machine. The construction and mode of operation of a roller seam welding machine are well known, and will not be described in detail here. In a roller seam welding machine the weld seam is formed between two electrode rollers, the actual electrode usually being provided in each case as a wire running over the roller.

FIG. 1 shows the setup for welding a can body 1 which has been formed into a cylinder from thin metal sheet with a thickness A and which at the welding zone forms an overlapping seam 3 which has a thickness 2A in the unwelded condition. The roller seam welding machine has two welding rollers 4 and 6, the lower welding roller 4 being arranged on a lower arm 5. The manner of mounting of this lower arm 5 is known and is not shown in the drawings. The lower arm 5 is usually spring mounted so that the welding roller 4 is pressed towards the upper welding roller 6. In known machines the upper welding roller 6 is pressed against the lower welding roller 4 with an adjustable constant force. This adjustment is conventionally made by means of a welding-force spring whose compression can be increased or reduced as required.

The embodiment of the invention shown in FIG. 1 is also provided with a spring 10 which exerts a force on the welding roller 6. This spring 10 is arranged in a sleeve 8 which is fixed to the machine so that the spring 10 is supported and fixed with respect to the machine at its upper end. The mounting of the upper welding roller 6 comprises a vertically movable pushrod 7 which carries a spring plate 9 which bears on the lower end of the spring 10. Vertical movement of the welding roller 6 causes a vertical movement of the plate 9 and hence compression or relaxation of the spring 10. Thus the spring 10 exerts on the roller 6 (and the workpiece) a welding force which can be set by adjusting the plate 9 or the sleeve 8 to alter the initial compression of the spring 10.

In the example shown, a casing 12 which is fixed to the machine is arranged above the sleeve 8. A spring element 14 arranged inside the casing 12 is able similarly to exert a vertical force along the longitudinal axis of the pushrod 7. In the example shown, the spring element 14, is held at its lower end in a buffer plate 13 which is supported on a wall of the casing 12 when the spring element is at rest. The upper end of the spring element 14 is held against a setting screw 15 by means of which, in the example shown, the initial compression of the spring element can be varied. The spring element 14 may be a coil spring like the spring 10, or it may for example be a pneumatic spring element in which compressed air provides the spring action. This also applies of course to the spring 10, which may likewise take the form of some other element than the coil spring element shown in the illustration.

The casing 12 is mounted on the machine with provision for vertical adjustment so that a gap D can be preset between the upper end of the pushrod 7 and the opposing face of the dish 13 when the welding rollers are at rest ie. when the upper welding roller 6 rests on the lower welding roller 4 and the workpiece has not yet been inserted between the rollers. The casing 12 may be provided with guide means which are known in themselves and are not shown in the drawing, allowing vertical adjustment of the casing eg. by means of a screw.

When the roller seam welding machine provided with the described spring arrangement is in operation, an effect can be obtained, namely a non-uniform variation in the welding force with roller deflection, in accordance with the invention. This can be explained by reference to FIG. 1, if one assumes that the can body shown in FIG. 1 is pushed between the welding rollers 4 and 6 in order that the overlapping seam 3 can be welded. As this happens, the welding rollers 4 and 6 are pushed apart, and the welding roller 6 is moved vertically upwards. As this movement takes place the spring 10 is operative initially, and it is the spring 10 acting in conjunction with inertial forces, primarily the inertia of the welding roller 6 itself, which applies a welding force at the start of the can body. As soon as the upper welding roller 6 is deflected to the point at which the gap D has been taken up by the pushrod 7, which is also moving upwards, the pushrod 7 strikes the plate 13. Upon further deflection, the spring element 14 is compressed, and exerts an additional force on the pushrod 7 and hence on the welding roller 6.

Thus, as soon as the deflection of the welding roller 6 exceeds the amount D, the combined force of the spring elements 10 and 14 comes into play; whereas initially, that is so long as the deflection of the welding roller has not reached the amount D, only the force of the spring element 10 is effective. This solves the problem of the initial weld point, as the spring 10 can be designed as a very weak spring exerting only a small force on the start of the body, this force being just sufficient to ensure that the body is reliably transported between the welding rollers at the initial stage of the operation. In passing over the rim, as the deflection of the welding roller 6 becomes greater, the second spring element 14, which will usually be relatively stiff, comes into play and its spring force is superimposed on that of the spring element 10, to attain the welding force required for the workpiece involved, which in the illustrated example is the overlapping seam 3.

The spring element 10 may be adjusted to a small force of eg. approximately 30daN. When welding a can body with an overlapping seam, the gap D is preferably approximately equal to a single sheet metal thickness A. The gap D may vary eg. in the range of 50–150% of the value A or in the range of 70–130% of the value A, but the range of 80–120% of A is preferred, and the range of 90–110% of the value A is further preferred. For other types of weld, eg. for butt welding a container body, other values for the gap D may apply, eg. the gap D may then be equal to half the sheet metal thickness A.

Figure 2:
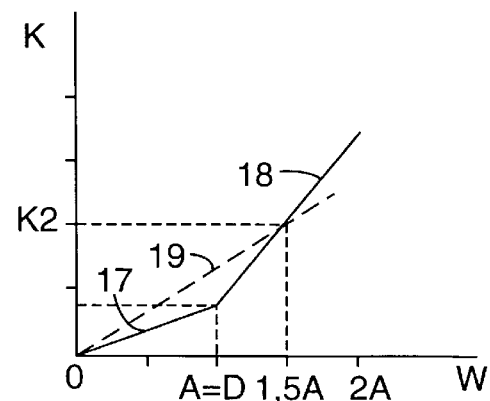
FIG. 2 is a displacement/force diagram for the spring arrangement shown in FIG. 1.

FIG. 2 shows schematically the spring force K plotted over deflection W for the two-spring system illustrated as an example. Up to the deflection A, which in the illustrated example is equal to the gap D, the force increases in accordance with the spring rate of the spring element 10 along the segment 17 of the curve. When the deflection reaches the value A=D, the force of the second spring element 14 comes into effect and the result is the segment 18 of the curve, in which the spring forces of the two spring elements 10 and 14 are combined. During welding along the seam behind the leading edge, mashing of the overlapping seam results in a deflection of eg. 1.5A, corresponding to the total spring force K2 which constitutes the required welding force. If, as has been the case until now, this spring force were produced with a single spring, it would have to follow the curve 19 shown as a broken line in FIG. 2. From this it can be seen that in the 0-A range of displacement the single spring exerts a considerably higher welding force on the leading edge of the body, which markedly increases the welding problem at the initial point. Therefore, the problem of welding the initial point can easily be avoided by the non-uniform variation in force with deflection according to the invention.

Instead of the special arrangement of two springs shown in FIG. 1 as an example, other two-spring arrangements may of course be chosen. For example, the springs may be arranged one inside the other. Alternatively, an arrangement may be adopted which has a single spring with variation in pitch producing a similar effect, with a non-uniform increase in spring force. Also, it is of course possible to provide more than two springs, arranged with gaps between them. A particular embodiment is obtained by omitting the spring 10 so that—after deflection D only—the spring 14 is effective. The spring arrangement then comprises simply the spring 14, and initial welding force is provided only by the inertia of the roller 6 and pushrod 7, until the increasing deflection brings the spring 14 into operation.

It has been found that the non-uniform variation in spring force also has a beneficial effect on the vibration behaviour of the whole system consisting of the spring-mounted. Overshoot of the welding roller 6 and trailing of the welding roller 4 are kept smaller by the non-uniform change in welding force with deflection, which has a positive influence on the weld quality of the seam. This is because the spring characteristic 18 in the range A to 2A is steeper than the conventional spring characteristic 19.

Instead of the illustrated example in which the roller 6 is subjected to a non-uniform variation in force with deflection, the roller 4 may also be sprung in a similar manner. However, it is preferable to use this form of springing for the roller 6, as it is more massive. It would also be possible for both rollers to have a non-uniform force versus deflection characteristic.

We claim:

1. A method for generating a welding pressure for welding an overlapping seam of sheet metal on a welding machine with two electrode rollers pressed together at a rest position by a spring force, characterized by:

providing one of said electrode rollers with a spring arrangement having a first spring with a first spring rate and a second spring with a second spring rate greater than the first spring rate;

causing the first spring to be deflected and produce a first spring force on the electrode roller upon deflection of the roller between the rest position and a welding position in which sheet metal to be welded is positioned between the two electrode rollers;

causing the second spring to be deflected and produce a second spring force on the electrode roller after the roller is deflected from rest and the first spring force is applied and during deflection of the electrode roller between a preset position of the roller different from the rest position and the welding position of the roller, the preset position of the electrode roller being disposed between the rest position and the welding position of the roller, whereby the spring arrangement produces a non-uniform variation in spring force on the electrode roller such that the first spring is the sole spring operating on the electrode roller during deflection from the rest position to the preset position and the first and the second springs are operative on the roller during deflection beyond the preset position and during welding of the sheet metal.

2. Method according to claim 1, characterized in that the preset position is displaced from the rest position by an amount greater than 50% of the thickness of the sheet metal.

3. Method according to claim 1 wherein the preset position is displaced from the rest position by an amount greater than 70% of the thickness of the sheet metal.

4. Method according to claim 1 wherein the preset position is displaced from the rest position by an amount greater than 80% of the thickness of the sheet metal.

5. Method according to claim 1 wherein the preset position is displaced from the rest position by an amount greater than 90% of the thickness of the sheet metal.

6. A method according to claim 1 wherein the sheet metal has a thickness and the preset position is set approximately equal to the thickness.

7. Apparatus for welding an overlapping seam of sheet metal on a welding machine using welding pressure and two electrode rollers, comprising:

a spring arrangement providing on one of the rollers a non-uniform variation in force with deflection of the roller from a rest position to a welding position and having first and second deflection ranges, the first deflection range extending from the rest position to the preset position and the second deflection range extending from the preset position to the welding position;

the spring arrangement having a first spring with a first spring rate and generating a first force on the roller in the first deflection range; and the spring arrangement having a second spring with a second spring rate greater than the first spring rate, and generating a second force on the roller only in the second deflection range in combination with the first spring.

8. Apparatus according to claim 7, characterized in that the spring arrangement comprises a helical spring and a pneumatic spring.

9. A method according to claim 7 wherein the first and second springs are deflected by equal amounts in the second deflection range.

* * * * *